April 12, 1938.    C. C. FARMER    2,113,615
VENT PROTECTOR
Filed May 7, 1936

INVENTOR
CLYDE C. FARMER
BY Wm. M. Cady
ATTORNEY

Patented Apr. 12, 1938

2,113,615

UNITED STATES PATENT OFFICE 2,113,615

VENT PROTECTOR

Clyde C. Farmer, Pittsburgh, Pa., assignor to The Westinghouse Air Brake Company, Wilmerding, Pa., a corporation of Pennsylvania Application May 7, 1936, Serial No. 78,423

4 Claims. (Cl. 303—1)

This invention relates to fluid pressure brake devices and more particularly to vent protectors of the type adapted to be applied to such devices for preventing vent passages, which open at the exterior surface of such devices, from becoming restricted or closed by foreign matter, insect nests or the like which would be liable to interfere with or possibly prevent the proper operation of the devices.

The principal object of the invention is to provide an improved vent protector of the above type.

Figure 1:
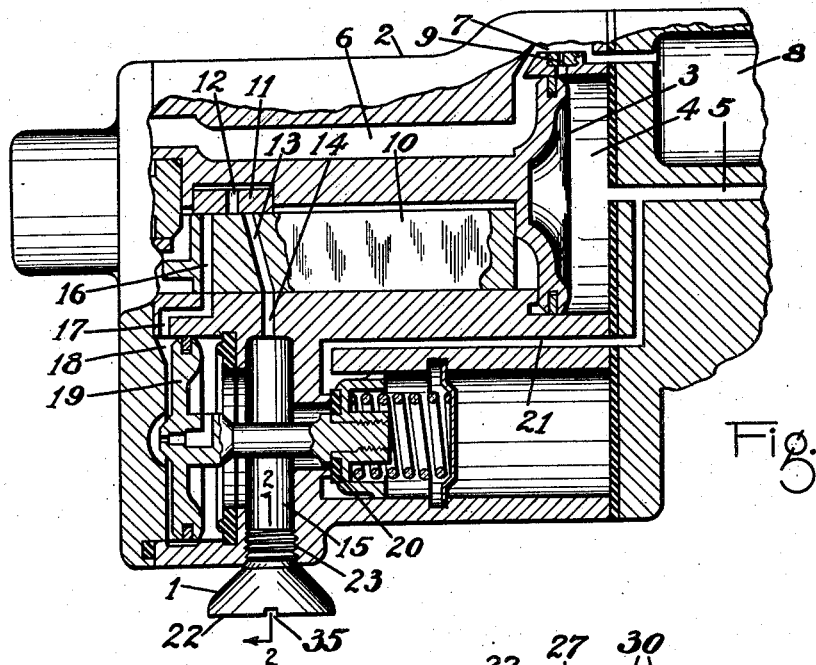
Figures 3, 4:
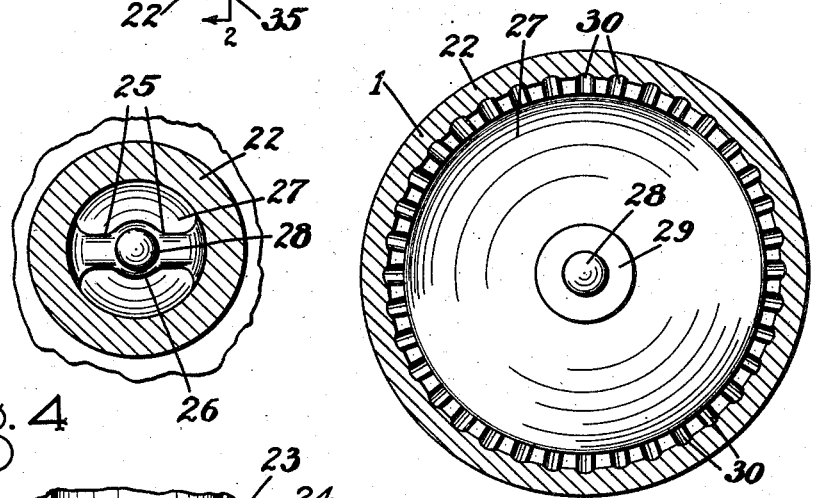
Figure 2:
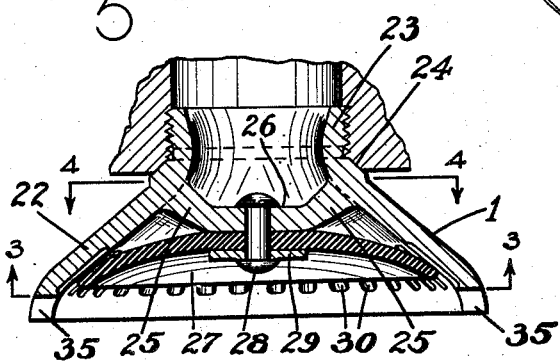

In the accompanying drawing; Fig. 1 is a diagrammatic, sectional view of a portion of an emergency valve device with the improved vent protector shown, in side elevation, applied thereto; Fig. 2 is an enlarged sectional view of the vent protector taken on the line 2—2 in Fig. 1; Fig. 3 is a sectional view taken on the line 3—3 in Fig. 2, and Fig. 4 is a sectional view taken on the line 4—4 in Fig. 2.

For the purpose of illustrating an application of the improved vent protector, said protector, which is designated by the reference numeral 1, is shown in Fig. 1 of the drawing associated with an emergency valve device 2 of the type disclosed in my Patent No. 2,031,213, issued February 18, 1936, only those parts of the emergency valve device being shown, however, which are deemed necessary to a comprehensive understanding of the invention.

The emergency valve device 2 comprises a piston 3 having at one side a chamber 4 connected to a passage 5 which leads to the usual brake pipe (not shown) and having at the opposite side a valve chamber 6 open through a passage 7 to a quick action chamber 8, said chambers being normally charged with fluid under pressure from the brake pipe by way of chamber 4 and a feed port 9.

A main slide valve 10 and an auxiliary slide valve 11 carried by and having movement relative to said main slide valve are disposed in chamber 6 and adapted to be operated by piston 3.

In operation, the emergency piston 3 is adapted to respond to a service reduction in brake pipe pressure in chamber 4 and move the auxiliary slide valve 11 relative to the main slide valve 10 to a service position. In this position a port 12 in the auxiliary slide valve 11 registers with a port 13 in the main slide valve 10, while the port 13 in turn registers in the normal position of the main slide valve with a passage 14 which leads to an exhaust passage 15 which is open to the atmosphere through the improved vent protector 1 which will be hereinafter described. Through the communication just described, the pressure of fluid in valve chamber 6 is adapted to reduce at the same rate as the brake pipe pressure in chamber 4 is reduced so as to prevent the piston 3 from moving the auxiliary slide valve past the service position.

Upon an emergency reduction in brake pipe pressure in piston chamber 4, the piston 3 operates to move the auxiliary slide valve 11 to an emergency position in which a port 16 in the main slide valve 10 is opened directly to valve chamber 6 and though this communication fluid under pressure is supplied from valve chamber 6 and quick action chamber 8 to a passage 17 which leads to a chamber 18 at one side of a vent valve piston 19. The piston 19 is thereby operated to unseat a brake pipe vent valve 20 past which fluid under pressure is suddenly vented from the brake pipe to the atmosphere by way of passage 5, a passage 21, past the vent valve 20 to passage 15 and from thence through the vent protector 1.

The vent protector 1 through which fluid supplied to passage 15 is vented to the atmosphere and which embodies the invention comprises a hollow cup or funnel shaped body 22 carried by a hollow screw-threaded portion 23 which is secured in the body of the emergency valve device by screw-threaded engagement. A beveled bearing surface 24 is provided on the body 22 adjacent and concentric to the screw-threaded portion 23 of the protector and engages a corresponding beveled surface on the emergency valve body, the friction between these engaging beveled surfaces being adapted to hold the protector in place in the emergency valve device. A pair of diametrically opposite slots 35 are provided in the outer end of the protector for receiving a spanner wrench or the like for applying or removing the fitting to and from the device 2.

A plurality of ribs 25 extend radially inwardly from the inner wall of the vent protector body 22 and are joined to and support at the center thereof a supporting member 26. A flexible circular diaphragm or disc 27 is secured to the member 26 by means of a rivet 28 which extends through said member and diaphragm and a supporting washer 29 which is clamped by the rivet against the outer face of the diaphragm.

The diaphragm 27 is somewhat larger in diameter than the diameter of the protector body where the diaphragm engages the member 26, so that in securing the diaphragm to said element, the diaphragm is flexed slightly so the periphery thereof is pressed against the inner wall of the vent protector body, and it will be noted that the body of the protector extends below the peripheral edge of the diaphragm so as to prevent rain, snow and the like from collecting on and around the diaphragm, which in case of freezing might prevent deflection of the diaphragm, it being understood that the vent protector is intended to be applied to a device so that the open end of the body 22 faces downwardly.

A plurality of relatively small spaced grooves 30 are provided lengthwise in the inner wall of the vent protector body and connect the chamber at one side of the diaphragm to the chamber at the opposite side. These grooves are provided to permit the release of fluid under pressure vented to the exhaust passage 15 upon a service reduction in brake pipe pressure without necessitating deflection of the diaphragm. This is very desirable in that if the diaphragm should become stuck to the vent protector body due to freezing of moisture or the like, the pressure of fluid in the quick action chamber may reduce as intended through the grooves 30, otherwise upon a service reduction in brake pipe pressure a sufficient differential of pressures might be obtained on the piston 3 to cause same to move to emergency position and thereby initiate an undesired emergency application of the brakes. Another important reason for these grooves 30 is that they permit moisture which may tend to collect in the chamber above the diaphragm to run out of the protector and thereby tend to avoid a sufficient collection of moisture in the protector to cause freezing of the diaphragm 27 to the body 22.

When the vent valve 20 is unseated and fluid under pressure is thereby suddenly vented from the brake pipe through passages 5 and 21 to the exhaust passage 15, the large amount of fluid at relatively high pressure thus obtained in said passage 15 causes the diaphragm 27 to deflect out of engagement with the body of the protector which permits rapid venting of this fluid under pressure from passage 15 to the atmosphere. The diaphragm will thus be operated upon operation of the vent valve 20 even if for any reason it should tend to stick around its periphery to the protector.

Since the grooves 30 are relatively small in cross-section and further, since the diaphragm engages the inside wall of the protector at a line or over an area spaced inwardly from the open end of the protector, it will be evident that the protector will act to prevent foreign matter such as dust, cinders, snow and rain from entering passage 15, and furthermore, will prevent insects, such as mud wasps, from entering said passage and then building a nest therein or in a passage, such as passage 14, which would be liable to cause the emergency valve device to fail to operate upon a service reduction in brake pipe pressure as intended.

While one illustrative embodiment of the invention has been described in detail, it is not my intention to limit its scope to this embodiment, or otherwise than by the terms of the appended claims.

Having now described my invention, what I claim as new and desire to secure by Letters Patent, is:

1. A vent protector for the exhaust passage of a fluid pressure brake device or the like comprising an element having a chamber open at one end to said exhaust passage and at the opposite end to atmosphere, means for securing said element to said device, and a flexible diaphragm secured to said element within said chamber and normally closing a relatively large vent communication through said chamber from said exhaust passage to atmosphere and adapted to be deflected by fluid under pressure supplied through said exhaust passage to open said communication, said element having a relatively restricted vent communication by-passing said diaphragm for permitting relatively slow venting of fluid under pressure from said exhaust passage to atmosphere.

2. A vent protector for the exhaust passage of a fluid pressure brake device or the like comprising an element having a chamber open at one end to said exhaust passage and at the opposite end to the atmosphere, a flexible diaphragm secured to said element with its peripheral portion normally engaging said element closing communication through said chamber to the atmosphere and adapted to be deflected by fluid under pressure supplied from said exhaust passage to move said peripheral portion out of engagement with said element to permit rapid venting of the actuating fluid under pressure to the atmosphere, said element having a plurality of relatively small and always open vents connecting the space at one side of said diaphragm to the space at the opposite side of the diaphragm for permitting a relatively slow venting of fluid under pressure from said exhaust passage to atmosphere.

3. A vent protector for the exhaust passage of a fluid pressure brake device or the like comprising a cup-like element having a chamber the open end of which is open to atmosphere and the other end is in communication with said exhaust passage, means securing said element to said device, a member disposed centrally within said chamber, means securing said member to said element, a flexible disc-like diaphragm disposed in said chamber and secured axially to said member, the diameter of said diaphragm being greater than the diameter of said chamber where said diaphragm is secured to said member whereby the peripheral edge of said diaphragm is normally flexed against the side wall of said chamber, said diaphragm being adapted to be flexed away from the side wall of said chamber by fluid under pressure supplied through said exhaust port for permitting the venting of such fluid under pressure to the atmosphere, said element having formed in the side wall of said chamber a plurality of relatively small grooves connecting the space at one side of the diaphragm to the space at the opposite side when said diaphragm is in engagement with the said wall for permitting relatively slow venting of fluid under pressure from said exhaust passage to atmosphere.

4. As an article of manufacture, a vent protector comprising a circular body having an outwardly flaring inner side wall bounding a chamber the larger end of which is open, a screw-threaded portion projecting from the smaller end of the body and having a passageway extending through said portion and opening into the smaller end of said chamber, a member disposed within said chamber and secured to said body, a flexible disc-like diaphragm disposed in said chamber with its periphery engaging said inner side wall of said chamber, and means securing said diaphragm at its center to said member, said body having formed therein a plurality of longitudinally extending relatively small slots connecting the space at one side of the diaphragm to the space at the opposite side when the periphery of said diaphragm is in engagement with the side wall of said chamber.

CLYDE C. FARMER.